No. 824,458. PATENTED JUNE 26, 1906.
G. R. WELCH.
MECHANICAL LUBRICATOR.
APPLICATION FILED NOV. 18, 1905.
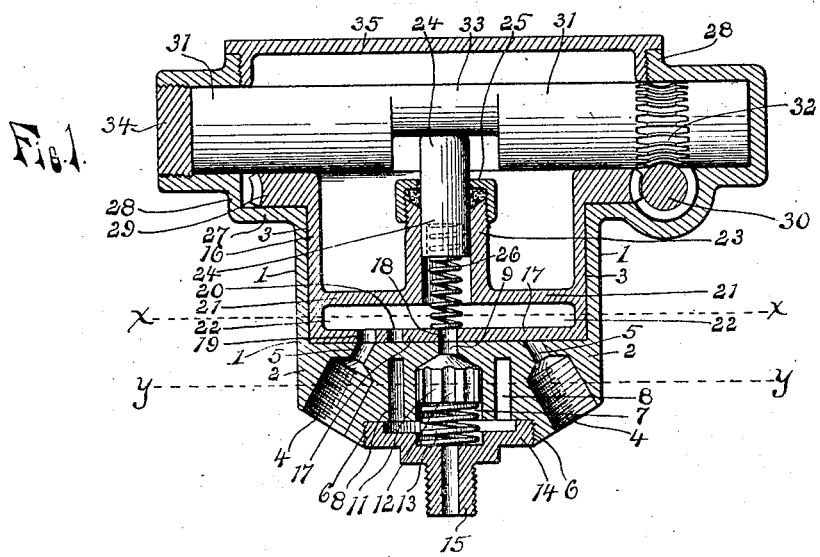
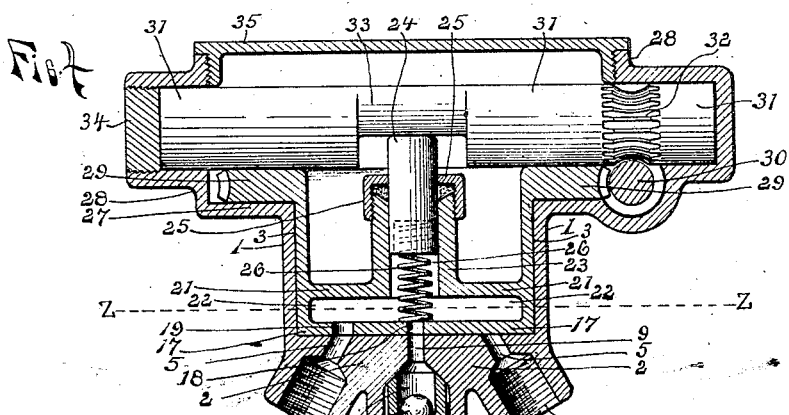
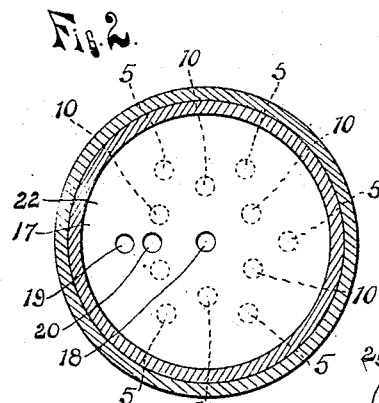
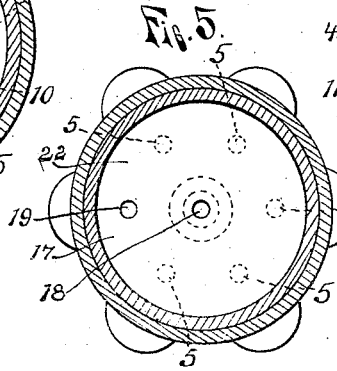
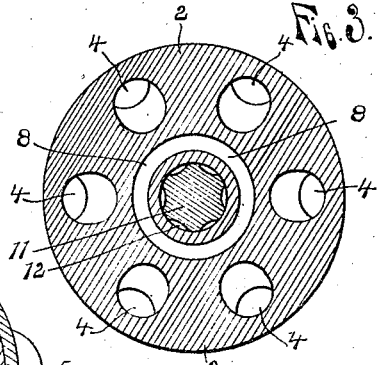
WITNESSES: INVENTOR.
George R. Welch
BY
ATTORNEYS.

UNITED STATES PATENT OFFICE.

GEORGE R. WELCH, OF DETROIT, MICHIGAN.

MECHANICAL LUBRICATOR.

No. 824,458.

Specification of Letters Patent.

Patented June 26, 1906.

Application filed November 18, 1905. Serial No. 287,927.

*To all whom it may concern:*

Be it known that I, GEORGE R. WELCH, a citizen of the United States of America, residing at Detroit, in the county of Wayne and State of Michigan, have invented certain new and useful Improvements in Mechanical Lubricators, of which the following is a specification, reference being had therein to the accompanying drawings.

This invention relates to improvements in mechanical or force-feed lubricators; and its object is to provide a lubricator of this class which is especially adapted for use upon automobiles, being very small, light, and compact in its construction, requiring a minimum amount of space, and made independent of the oil-supply tank, so that it may be located in any convenient place.

It is also an object of the invention to provide the device with means whereby any excess of oil pumped will be returned to the supply-pipe, thus preventing undue pressure and flooding of the parts, and to provide a simple construction which is positive and efficient in its operation and which has several other new and useful features, all as hereinafter more fully described, reference being had to the accompanying drawings, in which—

Figure 1 is a vertical section of a device embodying the invention; Fig. 2, a horizontal section of the same on the line $x \ x$ of Fig. 1; Fig. 3, a similar section on the line $y \ y$ of Fig. 1. Fig. 4 is a section similar to that of Fig. 1 of a device embodying a modified construction, and Fig. 5 is a horizontal section of the same on the line $z \ z$.

As shown in the drawings, 1 is a circular casing having a reduced and downwardly-extending cylindrical portion provided with a closed lower end 2, forming a cylindrical chamber 3 in said casing, and a series of sockets 4 are formed in said end to receive the screw-threaded ends of tubes (not shown) for conducting oil to the several parts to be lubricated or to any ordinary sight-feed, said sockets communicating with said chamber 3 through discharge-passages 5. In the axis of said end 2 is formed a chamber 6, and extending inward from said chamber is a socket 7 and also an annular chamber 8, outside of and around said socket. The socket 7 communicates with the interior of the casing or chamber 3 through an axial passage 9, and the annular chamber communicates therewith through a series of holes 10, corresponding in number to the number of discharge-passages 5.

The inner end of the socket 7 forms a valve-seat for a solid plug-valve 11, which is formed with a series of longitudinal grooves 12 in its side to permit a fluid to pass by the valve when said valve is forced downward from its seat against the action of a coiled spring 13, interposed between its lower end and a chambered disk 14, screwed into the chamber 6, said disk being provided with a downwardly-extending nipple 15 for the attachment of a supply-pipe (not shown) for supplying oil to said chamber and connected annular chamber 8.

Fitting closely within the chamber 3 in the casing is a rotatable cylindrical member or carrier 16, with its lower end or bottom 17 contacting the bottom of said chamber, and in said bottom is an axial hole 18, registering with the passage 9, and holes 19 and 20 to register, respectively, with the discharge-passages 5 and holes 10 as the carrier is turned. The holes 19 and 20 are placed in radial alinement, so that when hole 19 registers with one of the discharge-passages, as shown in Fig. 1, hole 20 will be closed, owing to the locating of each of the intake-holes 10 half-way between the two adjacent discharge-passages.

A horizontal partition 21 extends across the carrier at a short distance from its bottom to form an oil-chamber 22 therein, and extending upward at the axis of this partition is a hollow boss, which forms a cylinder 23 for a piston 24. The cylinder opens at its lower end into the oil-chamber 22 and at its upper end is provided with a stuffing-box 25, through which the upper end of the piston extends. The lower end of the piston is recessed to receive one end of a coiled spring 26, the opposite end of which rests upon the bottom of the oil-chamber, and this spring forces the piston upward in its cylinder.

Formed integral with the upper edge of the vertical wall of the carrier 16 and extending laterally outward therefrom in contact with the horizontal portion 27 of the enlarged circular upper end 28 of the casing is a flange 29, formed with gear-teeth on its periphery to mesh with a worm 30, mounted in bearings formed in the enlarged portion 28 of the casing, and mounted in suitable bearings in said enlarged end of the casing to extend diametrically across the same is a shaft 31, formed with a worm-gear 32 to mesh with the worm 30. This shaft 31 is reduced at its middle to form an eccentric 33, which engages the upper end of the piston 24, and as said shaft is turned operates to force the piston downward in its cylinder against the action of the spring 26. One of the bearings for the transverse shaft 31 is open at its end, so that the shaft may be shoved endwise into place, and a plug 34 is then screwed into the open end of the bearing to hold the shaft in place. The carrier 16 with its ring-gear is inserted in the casing through a large opening in the top thereof before the shaft 31 is inserted, said shaft when in place engaging the upper end of said carrier and holding the same firmly in place, and said opening is closed by a screw-cap 35.

The worm 30 may be driven by any of the well-known means, (not shown,) as continuously by a pulley or bevel-gears or intermittently by pawl and ratchet, and this worm in turn rotates the shaft 31 to force the piston down in its cylinder and turns the carrier 16, upon which said cylinder is mounted. In the position of the parts shown in Fig. 1 the piston is being forced downward by the eccentric 33, and the carrier is turned so that the discharge-hole 19 in the bottom of its oil-chamber registers with one of the discharge-passages 5, and thus oil is being forced by the piston from the chamber out through said passage to the bearing or other part to be lubricated. The turning of the eccentric is so timed relative to the movement of the carrier that upon the upward movement of the piston caused by the spring 26 as the eccentric recedes the intake-hole 20 in the bottom of the oil-chamber will be brought into line with one of the holes 10, leading into the chamber 8, which is in direct communication with the oil-supply, and thus oil will be drawn into said chamber during each upstroke of the piston, the discharge-hole 19 being closed during this tme. The carrier fits closely in the casing and is held down therein by the shaft 31 and also by the action of the spring 26, thus preventing any oil from passing into the upper part of the casing, and the stuffing-box 25 prevents oil from passing the piston.

The oil forced by the oiler into the several tubes screwed into the sockets 4 is preferably conducted to any ordinary multiple sight-feed where the flow of oil to each bearing or other part to be lubricated is regulated, and to prevent flooding of the parts or other damage should more oil be pumped by the continuous operation of the oiler than is drawn off through the sight-feed, owing to the regulation of the flow by the sight-feed or clogging of the parts, the passage 9, forming a connection between the oil-chamber and the supply-pipe through the socket 7, containing the check-valve 11, is provided, the check-valve being forced from its seat by any undue pressure in the oil-chamber caused by such oversupply therein and the excess allowed to pass back into the supply-pipe.

In the modified construction shown in Figs 4 and 5 instead of the annular chamber 8 and holes 10 to conduct the oil into the oil-chamber the socket 7 is provided with a check-valve 36, having an axial passage 37 and a socket 38 in its upper end for a ball 39, which is adapted to seat at the inner end of said socket and prevent the oil after it has been drawn inward through the passage past the ball by the action of the piston from being forced outward past the ball. Excess of pressure in the oil-chamber will only seat the ball more firmly, and if the pressure is great enough, caused by clogging of the parts, to overcome the action of the spring which holds the valve 36 to its seat the whole valve will be moved and the oil will escape past the valve through the grooves in its side.

Having thus fully described my invention, what I claim is—

1. In an oiler, the combination of a casing formed with a chamber having an intake and a discharge opening, a rotatable member in said chamber provided with an oil-chamber having openings adapted to register with the openings in the casing, a cylinder carried by said member in communication with the oil-chamber, a piston in said cylinder, and means for rotating said member and actuating the piston.

2. In an oiler, the combination of a casing formed with a chamber having an intake and a discharge opening, a rotatable member in said chamber provided with an oil-chamber having openings adapted to register with the openings in the casing, a cylinder formed integal with said member at its axis, and communicating with the oil-chamber, a piston in said cylinder, means engaging the piston to operate the same, and means for rotating said member.

3. In an oiler, the combinaton of a casing formed with a circular chamber having an intake and discharge openings in its bottom, a rotatable member adapted to fit closely within said chamber in contact with its bottom and provided with an oil-chamber having openings in its bottom to register with the intake and discharge openings as said member is turned, a cylinder carried by said rotatable member, a piston in said cylinder, and means for actuating the piston and rotating the said member.

4. In an oiler, the combination of a casing formed with a circular chamber having discharge-passages leading from its bottom and a recess in the lower end of the casing formed with a valve-seat at its inner end and connected with said chamber by a passage, a valve fitting within said recess and provided with longitudinal grooves in its side, a spring to hold the valve to its seat, a rotatable member within the chamber engaging the bottom thereof to close the passages and having openings to register therewith as the member is turned, a cylinder carried by said member, a piston in said cylinder, and means for rotating said member and actuating the piston.

5. In an oiler, the combination of a casing formed with a circular chamber having an intake and a discharge-passage in its bottom, a rotatable member fitting within said chamber and formed with an oil-chamber the bottom of which engages the bottom of the chamber in the casing to close said passages and is provided with openings to register with said passages as said member is turned, a cylinder in the axis of said member opening into the oil-chamber, a piston in said cylinder, a shaft mounted in bearings in the casing, an eccentric on said shaft to engage and operate the piston, and means for rotating said member and shaft.

6. In an oiler, the combination of a casing formed with a circular chamber and two concentric series of openings in the bottom of said chamber, the openings of one series being spaced intermediate those of the other series, a rotary member to fit within said chamber and having an oil-chamber the bottom of which contacts the bottom of said chamber in the casing to close said openings in the casing and is provided with two holes arranged in radial alinement to register with the two series of openings, a cylinder on said member opening into the axis of said oil-chamber, a piston in said cylinder, a shaft extending diametrically across the casing and mounted in bearings therein, an eccentric on said shaft to engage and actuate the piston, and means for turning said shaft and rotary member in timed relation to each other.

7. In an oiler, the combination of a casing formed with a circular chamber, an oil-supply chamber, inlet-passage connecting the said chambers, outlet-passages leading from said circular chamber, and an axial passage connecting the circular chamber and oil-supply chamber, a rotary member adapted to fit closely in said circular chamber to close the passages and formed with an oil-chamber having openings adapted to register with said passages; a check-valve in the axial passage leading from the circular chamber into the oil-supply chamber; a cylinder carried by the said rotary member and communicating with the oil-chamber thereon; a piston in said cylinders; and means for rotating said member and actuating said piston in timed relation to each other.

8. In an oiler, the combination of a casing formed with a downwardly-extending cylindrical portion forming a circular chamber and an enlarged circular upper end, the lower end being formed with an intake and a series of discharge-passages communicating with said chamber; a rotary member formed with a cylindrical portion to fit within said chamber and a closed end contacting the bottom of the chamber and provided with openings to register with the passages; a partition in the lower end of said member to form an oil-chamber therein; a cylinder formed integral with said partition at its axis and open at its lower end into said oil-chamber; a piston in said cylinder; a flange on the upper edge of said member provided with gear-teeth; a transverse shaft mounted in bearings in the upper part of the casing; an eccentric on said shaft to operate the piston; and means engaging said gear-teeth and said shaft to actuate both.

9. In an oiler, the combination of a casing having a downwardly-extending cylindrical lower end forming a circular chamber and provided with a socket extending inward from its lower end formed with a valve-seat at its inner end, an annular chamber surrounding the socket, an external chamber, an axial passage connecting the socket with the internal chamber, a series of openings connecting the annular chamber and internal chamber and a series of discharge-passages opening from the bottom of the internal chamber; a valve having longitudinal grooves in its side within said socket; a chambered disk screwed into the external chamber and provided with a downwardly-extending nipple; a coiled spring interposed between the valve and said disk; a rotatable member fitting within said internal chamber of the casing and provided with an oil-chamber in its lower end having openings in its bottom to register with the openings and passages in the casing; a cylinder formed integral with said member and extending upward at the axis of the oil-chamber thereof; a piston in said chamber; a stuffing-box on the upper end of said cylinder; a coiled spring engaging the lower end of the piston to actuate the same in one direction; a shaft mounted in bearings in the casing; an eccentric on the shaft to engage and actuate the piston in the opposite direction; an outwardly-extending flange on the rotary member having gear-teeth; a worm-gear on the shaft; and a worm to engage said gear and gear-teeth.

In testimony whereof I affix my signature in presence of two witnesses.

GEORGE R. WELCH.

Witnesses:
 THOS. G. LONGSTAFF,
 OTTO F. BARTHEL.